(12) United States Patent
Rodriguez et al.

(10) Patent No.: US 10,490,866 B2
(45) Date of Patent: Nov. 26, 2019

(54) METHOD FOR ACID DISSOLUTION OF LICOO$_2$ CONTAINED IN SPENT LITHIUM-ION BATTERIES

(71) Applicants: CONSEJO NACIONAL DE INVESTIGACIONES CIENTÍFICAS Y TÉCNICAS (CONICET), Ciudad Autónoma de Buenos Aires (AR); UNIVERSIDAD NACIONAL DE CUYO, Ciudad de Mendoza Procincia de Mendoza (AR); INIS BIOTECH LLC, Milford Kent County, DE (US)

(72) Inventors: Mario Humberto Rodriguez, Mendoza Mendoza (AR); Daniela S. Suarez, Luján de Cuyo Pcia. de Mendoza (AR); Eliana G. Pinna, Las Heras Pcia. de Mendoza (AR); Celina N. Zeballos, Mendoza Pcia. de Mendoza (AR)

(73) Assignees: CONSEJO NACIONAL DE INVESTIGACIONES CIENTÍFICAS Y TÉCNICAS (CONICET), Ciudad Autónoma de Buenos Aires (AR); UNIVERSIDAD NACIONAL DE CUYO, Prov. de Mendoza (AR); INIS BIOTECH LLC, Milford Kent County, DE (US)

( * ) Notice: Subject to any disclaimer, the term of this patent is extended or adjusted under 35 U.S.C. 154(b) by 0 days.

(21) Appl. No.: 15/768,407

(22) PCT Filed: Oct. 14, 2016

(86) PCT No.: PCT/IB2016/056189
§ 371 (c)(1),
(2) Date: Apr. 13, 2018

(87) PCT Pub. No.: WO2017/064677
PCT Pub. Date: Apr. 20, 2017

(65) Prior Publication Data
US 2018/0309174 A1  Oct. 25, 2018

(30) Foreign Application Priority Data
Oct. 14, 2015  (AR) .............................. 20150103322

(51) Int. Cl.
*B09B 3/00*  (2006.01)
*C22B 26/12*  (2006.01)
(Continued)

(52) U.S. Cl.
CPC ............... *H01M 10/54* (2013.01); *B09B 3/00* (2013.01); *C22B 1/005* (2013.01); *C22B 3/165* (2013.01);
(Continued)

(58) Field of Classification Search
CPC ..................................................... C22B 3/165
See application file for complete search history.

(56) References Cited

U.S. PATENT DOCUMENTS

2013/0287654 A1  10/2013  Yamada et al.

FOREIGN PATENT DOCUMENTS

| DE | 19842658 A1 | 4/1999 |
| JP | 60161331 A | * 8/1985 |
| JP | 2014114470 A | * 6/2014 |

OTHER PUBLICATIONS

Xu et al. A Review of Processes and Technologies for the Recycling of Lithium-ion Secondary Batteries. Journal of Power Sources, Elsevier SA, CH, vol. 177, No. 2. Jan. 21, 2016. 17 Pages.
(Continued)

*Primary Examiner* — Melissa S Swain
(74) *Attorney, Agent, or Firm* — Muncy, Geissler, Olds & Lowe, P.C.

(57) ABSTRACT

A method for the acid dissolution of LiCoO$_2$ contained in the cathode of lithium ion batteries, using acetic or tartaric acid as leaching agent, the method being characterized in that it comprises a first stage and a second stage, wherein said first stage comprises the step of separating the cathode components, while said second stage comprises the step of dissolving the pure $LiCoO_2$ with at least one acid. The method allows achieving an economically viable complete recycling process with low environmental impact.

6 Claims, 5 Drawing Sheets

(51) Int. Cl.
    *C22B 3/16*     (2006.01)
    *H01M 10/54*     (2006.01)
    *C22B 1/00*     (2006.01)
    *C22B 7/00*     (2006.01)
    *C22B 3/00*     (2006.01)

(52) U.S. Cl.
    CPC .......... *C22B 7/007* (2013.01); *C22B 23/0415* (2013.01); *C22B 26/12* (2013.01); *Y02P 10/234* (2015.11); *Y02W 30/84* (2015.05)

(56) References Cited

OTHER PUBLICATIONS

Chen et al. Process for the Recovery of Cobalt Oxalate from Spent Lithium-ion Batteries. ScienceDirect. Hydrometallurgy, Elsevier BV, vol. 108, 80-86. Aug. 23, 2010. 7 Pages.
Li et al. Enviromental Friendly Leaching Reagent for Cobalt and Lithium Recovery from Spent Lithium-ion Batteries. ScienceDirect. Waste Management, Elsevier BV vol. 30 2615-2621, Mar. 16, 2010, 7 Pages.
Li et al. Preparation of LiCoO2 Films from Spent Lithium-ion Batteries by a Combined Recycling Process. ScienceDirect. Hydrometallurgy, Elsevier BV, vol. 108, 220-225 Feb. 16, 2011, 6 Pages.
Li et al. Recovery of Metals from Spent Lithium-ion Batteries with Organic Acids as Leaching Reagents and Enviornmental Assessment. Journal of Power Sources, vol. 233, 180-189. Oct. 17, 2012, 10 Pages.
Wang et al. A Novel Recovery Process of Metal Values from the Cathode Active Materials of the Lithium-ion Secondary Batteries. Hydrometallurgy, Elsevier BV. vol. 99, 194-201. May 11, 2009. 8 Pages.
Zhu et al. Recovery of Co and Li from Spent Lithium-ion Batteries by Combination Method of Acid Leaching and Chemical Precipitation. ScienceDirect. Trans. Nonferrous Met. Soc. CN vol. 22, 2274-2281. Sep. 23, 2011. 8 Pages.

\* cited by examiner

METHOD FOR ACID DISSOLUTION OF LICOO₂ CONTAINED IN SPENT LITHIUM-ION BATTERIES

TECHNICAL FIELD OF THE INVENTION

The present invention relates to a method for the acid dissolution of $LiCoO_2$ contained in the cathode of lithium-ion batteries, using acetic or tartaric acid as leaching agent.

BACKGROUND OF THE INVENTION

The increase in oil prices, the demand for urban vehicles, the mega cities and the new approach to sustainable transport has led to a trend towards the use of alternative energy sources for cars, which resulted in hybrid vehicles (EVs). Estimates suggest that by 2020, EVs will account for 7% of the global transport market. However, there are concerns about the supply of critical elements needed for these vehicles batteries, as there is a threat to the availability of lithium needed for production of such batteries. This situation has changed the focus on the sources from which this metal is obtained, in order to ensure its continuous supply, arising thus the possibility to reuse and recycle these batteries. With over 70% of EVs probably introduced in 2015 based on the chemistry of lithium-ion (Li-ion) batteries, lithium recycling has become a crucial topic in the automotive industry.

In the future, many challenges are likely to have an impact on lithium supply. Although there are enough lithium resources available in the World to meet the demand, nearly 70% of global lithium deposits are located in Argentina, Bolivia and Chile. This causes an inherent risk due to the accessibility of raw materials that are only available in a specific region, which can greatly affect supply and have an impact on battery prices.

Lithium is also consumed in numerous applications or sectors, such as construction, pharmaceuticals, ceramics and glass, so that consumption in the automotive industry is only a small fraction. Heretofore, batteries account only for a quarter of the current lithium consumption, although it is expected to reach 40% by 2020. Lithium represents only a small fraction of the cost of the raw materials needed for batteries manufacture.

Intergovernmental initiatives are being carried out in order to ensure lithium resources. Vehicle manufacturers and national governments are treating lithium as a source of future energy and have begun strengthening alliances to safeguard their needs. Toyota and *Magna* International-Mitsubishi have strengthened links with lithium exploration companies and have heavily invested to develop lithium deposits in Argentina and secure resources to strengthen their needs. Japan has signed agreements with the Bolivian government to provide economic aid in exchange for lithium and other rare metals supplies. Original equipment manufacturers are seeking to overcome lithium dependence by reusing lithium batteries for other applications and by recycling batteries after their life cycle have been completed. However, recycling batteries makes no economic sense. Batteries contain only a small fraction of lithium carbonate in weight percentage and are inexpensive compared to cobalt or nickel. The average cost associated to lithium production in lithium ion batteries is less than 3% of the production cost. The intrinsic value in the recycling business comes from more valuable metals, such as cobalt and nickel, which are more expensive than lithium. Due to a lower lithium demand and lower prices, lithium used in consumer batteries is not completely recycled.

Recycled lithium is five times more expensive than lithium produced from mineral sources, so recycling is not competitive for companies in the sector. However, with an increasing number of EVs entering the market, future shortages are foreseeable, which can lead to recycling being a necessity for the supply of batteries materials.

The battery recycling market is conditioned mainly by price, because technology is not a critical differentiator. All key participants use the same technology level in their offered products. Therefore, price is the key differentiating factor, which reduces the benefit for battery recycling companies in a competitive environment.

Specialized processes and small-scale recycling plants nearby vehicle manufacturers are likely to be the trend in the future. The main obstacle hindering such projects is the nature of the financial investments required by participants to develop specialized waste collection. Given that the market is still unexplored, the specific impacts and the total benefit of these investments are unknown and, therefore, would create ambiguity and uncertainty when making such commitments.

With lithium recycling just in its beginning, there is no infrastructure in the world, except for some pilot plants currently in development stage.

The lack of standards in the batteries chemistry and a changing environment with respect to different elements under investigation for the production of batteries other than lithium, make recycling of components uncertain for recyclers.

The use of lithium ion batteries in electronic devices and electric vehicles is continuously increasing. This type of battery is one of the most commonly used because of its high energy density, high voltage, long of charge and discharge cycles, wide temperature range, decreased risk of explosion and absence of memory effect [1].

Lithium ion batteries are composed of a cathode, an anode, organic electrolytes and a separator film. The cathode generally contains an Al foil covered by a thin layer of $LiCoO_2$ powder and the anode is formed by a Cu foil covered by a layer of graphite. Both electrodes are separated by a film and are coated with a compound electrolyte with a Li salt, soluble in organic solvents [1]. The increase in lithium ion battery production has made recycling of its components increasingly important, since its unsafe disposal can cause serious environmental problems [2]. Hydrometallurgical processes are among the processes used for recycling batteries, which have as main advantages the full, high-purity recovery of metals, low energy requirement, and minimum generation of aqueous and gaseous waste [2]. The reductive dissolution of $LiCoO_2$ has been studied using inorganic acids, such as $H_2SO_4$ [3], $HNO_3$ [4] and HCl [5]; alkalis, wherein the most used compound has been NaOH [6], and organic acids, such as citric, malic and aspartic acids. Li et al. (2013) conducted a comparative study of the operating variables of the reductive dissolution of $LiCoO_2$ process using citric, aspartic and malic acids. They reported near 100% recoveries for Li and above 90% for Co using citric acid and malic acid. In the case of aspartic acid, lower dissolutions were obtained due to the weak character of the acid and its low solubility in water [1].

Acetic acid is an organic acid produced by synthesis and by bacterial fermentation, which has high solubility in water and is biodegradable. In the present invention, as detailed below, a study of the effect of operating variables on the acid dissolution of lithium and cobalt mixed oxide from lithium ion batteries is described. Several documents on the dissolution of $LiCo_2$ are known. The following are among them, and their problems compared with the development of the present invention are presented below:

1) Novel Approach to Recover Cobalt and Lithium from Spent Lithium-Ion Battery Using Oxalic Acid Authors: Xianlai Zeng, Jinhui Li, Bingyu Shen In this work, the authors dissolve $LiCoO_2$ with oxalic acid.

The inventors have carried out experimental tests in the conditions of this work and in other conditions and confirmed that during the leaching process with oxalic acid and oxalic acid-hydrogen peroxide as leaching agents, at concentrations lower or greater than stoichiometric, oxalate cobalt precipitates; noting that, for concentration values closer to stoichiometric, $LiCoO_2$ solutions of very low concentration are achieved. Moreover, cobalt oxalate precipitation is greater with increasing concentration of oxalic acid and temperature. Moreover, it is not easy to separate the unreacted oxide and the cobalt oxalate co-precipitate. This requires multistage separation and purification. The inventors have carried out several tests attempting to separate those using various chemical agents, for example inorganic acids and bases, organic solvents, etc. and, in no case was it possible to completely dissolve the $CoC_2O_4$ or the LiCoO2; From these results, it can be concluded that its industrial feasibility is very low.

Moreover, and very importantly, the authors of this work (Xianlai et al.) reflect the cobalt oxalate precipitation, under "3.2. Optimizing the process for leaching cobalt and lithium".

Another aspect to be noted is that, in this work, the authors carried out a complete grinding of the cathode, i.e. the sample contains: $LiCoO_2$ and Al, therefore, during the dissolution stage with oxalic acid and hydrogen peroxide, Al is also leached (reaction 5) and will interfere with and/or contaminate the obtained products, as these authors did not perform a separation stage prior to dissolution or during precipitation or retrosynthesis. Therefore, the obtained products contain aluminum or a compound thereof. Aluminum is part of the cathode as a support, and $LiCoO_2$ is adhered thereto, which is clearly seen in the sample as "bright spots" (in the graphic summary "Highlights") and whose contents are also reported by the authors in Table 1 and FIG. 1. Cobalt oxalate contaminated with coal also appears in the products.

2) Recovery of Cobalt and Lithium from Spent Lithium Ion Batteries Using Organic Citric Acid as Leachant Authors: Li Li, Jing Ge, Feng Wu, Renjie Chen, Shi Chen, Borong Wu In this work the authors carry out pretreatments of the sample, which involve freezing the battery to −197° C. using liquid nitrogen, manually opening the battery (at low temperature), treatment with solvent and calcination at 700° C. for 5 h. After this pretreatment of the sample, the authors carry out the dissolution with citric acid and hydrogen peroxide.

Finally, Li et al. do not attempt any experiment to study the separation of Li and Co dissolved with citric acid. It should be noted that that the citric acid is a strong ligand which produces highly stable complexes with Co, therefore, this ligand is difficult to displace and its compounds are highly soluble and stable; the authors do not report results on this separation.

Differences between this process and the one disclosed herein are: the dismantling of the sample and the separation of its components do not require steps of freezing, no solvents are used and the sample is not calcined. The dissolution carried out in the process disclosed herein is of the mixed oxide only, yielding, in some cases, leaching greater than 95%, followed by a separation process with pure filtrates. Given that the authors of this work (Li et al.) do not carry out the separation of Li and Co, this process cannot be evaluated. That is, Li et al. only reach the solution containing lithium and cobalt by leaching with citric acid, not with acetic or tartaric acid, as is done herein. In addition, as mentioned above, they do not recover both metals; although the abstract mentions that said citrates of Li and Co are obtained, the complete flow chart of the process they propose (FIG. 2) ends with a solution containing Li and Co previously dissolved with citric acid; they do not propose any process for the separation of the obtained products in solution.

Therefore, even combining the process in Li et al. with the one in Xianlai, the results obtained with the method of the present invention would not be achieved, since in the second stage of the present method, almost complete dissolutions of LiCoO2 are obtained, without the presence of other interfering elements.

3) The Re-Synthesis of $LiCoO_2$ from Spent Lithium Ion Batteries Separated by Vacuum-Assisted Heat-Treating Method Authors: Mi Lu, Houan Zhang, Bingchen Wang, Xiaodong Zheng, Changsong Dai The work of Lu et al. aims at re-synthesizing $LiCoO_2$, but the previous process to obtain the powder which is then dissolved, it is not industrially feasible as it passes through several previous steps, such as heating the sample to 600° C. in vacuum, followed by further heating to 800° C. to remove anode coal and/or the adhesive used to adhere the $LiCoO_2$ to the aluminum foil. The process then proceeds to another quite costly step of grinding for 2 h in a mill, then ending with a final calcination step at 750° C. for 15 hours, whereby re-synthesis of the oxide is achieved.

4) Battery Recycling Technologies: Recycling Waste Lithium Ion Batteries with the Impact on the Environment in-View.

Authors: Chunxia Gong and Lixu Lei

This work is a review where a description of all treatment processes on lithium ion recycling of batteries is made. In this work, it is recommended that the dissolution with solvent prior to the dissolution is the most recommended technique. This is an advantage of our process.

The authors of this review describe various hydrometallurgical processes that combine the dissolution of the mixed oxide with various inorganic acids and the compounds of Li and Co are separated and/or precipitated using NaOH or organic solvents. Finally, they propose as more viable a hydrometallurgical process (FIG. 4, from Chunxia Gong and Lixu Lei) containing alkaline leaching, treatment with solvent to dissolve the powder with sulfuric acid, then recovering the Co with oxalic acid and Li with $Na_2CO_3$. However, the leaching of the powder with $H_2SO_4$ is low unless high concentrations of this acid are used or unless the acid is mixed with hydrogen peroxide; if so, the high concentration of sulfuric acid would decompose the oxalic acid and sodium carbonate, which are the used precipitating agents. With the method of the present invention, as detailed below, only $Li_2CO_3$ precipitates with sodium carbonate after precipitation of Co with NaOH, whereby the excess acid is neutralized beforehand.

5) Patent "Method for Preparing $LiCoO_2$-Coated NiO Cathodes for Molten Carbon Fuel Cell". U.S. Pat. No. 6,296,972 B1

Authors: Hong et al.

In this patent, the authors apply a known method for synthesis of materials as is the "sol gel" method to a novel type of NiO (Ni oxide) cathode coated with a mixed oxide of lithium and Co. This $LiCoO_2$ synthesis process was developed for other cathodes, whereby its teachings cannot be applied to the cathodes of the present invention.

Another aspect of the method of the present invention, as detailed below, is re-synthesizing again the mixed oxide of lithium and Co by the sol-gel method from solutions obtained from acetic or citric acid leaching of this spent oxide, since high dissolutions of the mixed oxide of lithium and cobalt are achieved and said oxide is composed of a solution of Co and Li (as oxide precursors) with minimal impurities, as the method of the present invention makes a prior separation of the components of lithium ion battery; there are no other components that can be dissolved. Afterwards, the sol-gel method is carried out as indicated in the art, without the need of adding a binder.

It should be noted that the process of the present invention, as will be detailed later, has a dissolution stage in which only carboxylic acids are used, the decomposition of which in the final calcination step to generate the oxide produces $CO_2$, which can be captured and properly treated or reprocessed. That is, the complete process has a low environmental impact and is economically viable.

BRIEF DESCRIPTION OF THE INVENTION

It is therefore an object of the present invention to provide a method for the acid dissolution of $LiCoO_2$ contained in the cathode of lithium ion batteries, using acetic or tartaric acid as leaching agent, achieving a low environmental impact and economically viable complete process.

It is therefore an object of the present invention to provide a method for the acid dissolution of $LiCoO_2$ contained in the cathode of Li-ion batteries, using acetic or tartaric acid as leaching agent, wherein the method comprises a first stage and a second stage, wherein said first stage comprises the step of separating the cathode components, while said second stage comprises the step of dissolving the pure $LiCoO_2$ with at least one acid.

In a preferred embodiment of the present invention, said first stage comprises dissolving the glue by means of one or more of the diluted acids $H_4C_2O_2$, $H_6C_4O_6$, $H_8C_6O_7$, $HNO_3$ or $H_2SO_4$ and obtaining on the one hand, the aluminum foil as material to recycle and on the other hand $LiCoO_2$ without impurities, to be treated in the next stage, together with a generated effluent containing said remnant acids.

In a more preferred embodiment of the present invention, said effluent generated after several reuse stages of $H_2SO_4$ acid is treated using calcium hydroxide for precipitation as calcium sulfate.

In yet another more preferred embodiment of the present invention, after filtering the calcium sulfate, the remaining liquid is dried at low temperatures and the obtained residues are treated by a residue operator.

In another preferred embodiment of the invention, said effluent generated after several reuse stages of acids $H_4C_2O_2$, $H_6C_4O_6$, $H_8C_6O_7$ or $HNO_3$ can be incorporated into the dissolution stage of $LiCoO_2$.

In a preferred embodiment of the invention, said second stage is carried out starting from a solid without impurities, which is dissolved with acetic or tartaric acids at low acid concentrations, lower than 15% v/v or lower than 5% w/v, using brief reaction times, lower than 60 minutes and a temperature of 75° C., achieving high dissolutions of the mixed oxide.

In an even more preferred embodiment of the present invention, pure lithium and cobalt compounds are separately obtained by chemical precipitation after said second stage.

In a preferred embodiment of the present invention, in said chemical precipitation known chemical agents are used, such as for example: sodium hydroxide for obtaining mixed cobalt oxide ($CoOCo_2O_3$) and oxalic acid, for obtaining cobalt oxalate ($CoC_2O_4$).

In a preferred embodiment of the present invention, after said precipitation, the remainder solution is subsequently concentrated by evaporation and treated with $Na_2CO_3$ or $CO_2$ to obtain $Li_2CO_3$.

In another embodiment of the present invention, by employing the sol-gel synthesis method directly to any of the obtained solutions, $LiCoO_2$ is newly obtained.

BRIEF DESCRIPTION OF THE DRAWINGS

For better clarity and understanding of the object of the present invention, it has been illustrated in several figures, in which one of the preferred embodiments has been represented as an example, wherein.

DETAILED DESCRIPTION OF THE INVENTION

The invention will now be described in detail with reference to the drawings which illustrate a preferred embodiment by way of example only, which is non-limiting to the scope of the invention.

The method which is an object of the present invention comprises a first stage, relating to the separation of the cathode components. In this stage, the separation of the aluminum foil from the mixed oxide of lithium and cobalt ($LiCoO_2$) using diluted aqueous solutions of acetic or tartaric or citric or nitric or sulfuric acid at concentrations and times lower than 2% v/v and 15 respectively was carried out at room temperature. With this treatment, any of the adhesives used to adhere the $LiCoO_2$ to the aluminum foil are dissolved. As a result of this process, the clean aluminum foil (free of glue and $LiCoO_2$) on the one hand and on the other hand the $LiCoO_2$ (free of glue and Al) are obtained, after a stage of filtering and washing with distilled water.

At this point, it should be noted that there are several works in the literature regarding the joint treatment of the main components of the cathode and anode (cathode: aluminum+glue+LiCoO2, and anode: copper+carbon+glue+ etc.). In most of them, organic solvents or mixtures thereof are used in order to dissolve the glue from both electrodes jointly, and as a result the sample obtained after the above-mentioned treatment contains, in addition to the components of the cathode, the ones from the anode, which pass to the solution in the leaching stage. Since they are leached together, several separation stages prior to dissolution or separation and/or purification treatments after leaching might be needed in order to obtain pure compounds. In addition, the organic solvents employed have the disadvantage of being expensive, flammable, of difficult handling and recycling, and hazardous to health. In a few works, grinding of the entire cathode is carried out, thus obtaining a solid containing, besides $LiCoO_2$, adhesives and aluminum remains; all of these components will be dissolved in the dissolution stage. In this case, the precipitation stage of Co is difficult due to the presence of aluminum; this has been partially solved by the authors by using specific organic solvents for cobalt, which adds one more separation stage involving an additional solvent, with the problems the latter entails.

Considering the drawbacks described in the present invention, at this stage, diluted $H_4C_2O_2$, $H_6C_4O_6$, $H_8C_6O_7$, $HNO_3$ or $H_2SO_4$ acids are used to dissolve the glue and obtain, on one hand, the aluminum foil (material for recycling) and on the other the $LiCoO_2$ without impurities to be treated in the next stage (2nd stage). The effluent generated after various stages of acids reuse may be appropriately treated, for example in the case of the use of carboxylic acids, these effluents can be incorporated into the $LiCoO_2$ dissolution step; or by using calcium hydroxide in the case of the effluent containing $H_2SO_4$, where the remainder is precipitated to yield calcium sulfate (gypsum). After filtration of this product, the remaining liquid is dried at low temperatures and the remainders obtained are treated by a waste operator. It is noteworthy that the amount of glue contained in the cathode of each battery is of about 50 mg depending on the size of said device. In short: the separation stage uses inexpensive and reusable acids, at low concentrations and for a short period of time; the generated effluents are recycled almost completely and in addition the separation of the component to be used in the subsequent dissolution stage ($LiCoO_2$) is effectively achieved without the need for further treatment stages and/or processes. Considering the above, in this stage, the procedure significantly improves the procedures of the prior art, being for these reason advantageous.

Subsequently, the method of the present invention has a second stage which comprises dissolving the pure $LiCoO_2$ with different acids to those found in the literature, such as acetic and tartaric. This stage starts from a solid without impurities, which is dissolved with acetic or tartaric acid at low acid concentrations (<15% v/v or <5% w/v) using short reaction times (<60 min) and a temperature of 75° C., thus achieving high dissolutions of the mixed oxide. In this stage a solution containing only Li, Co and acetic or tartaric acid "free from impurities" is obtained, which allows obtaining:

By chemical precipitation, pure lithium and cobalt compounds separately. Known chemical agents are used, such as: with sodium hydroxide, sodium mixed cobalt oxide ($CoOCo_2O_3$) is obtained and, with oxalic acid, cobalt oxalate ($CoC_2O_4$) is obtained. Then, the remaining solution is concentrated by evaporation and treated with $Na_2CO_3$ (traditional method) or $CO_2$ (new method for this system) to obtain $Li_2CO_3$.

Using the sol-gel synthesis method directly on any of the obtained solutions "without the addition of a binder" the $LiCoO_2$ is again obtained (re-synthesized).

It is herein emphasized that, although there are several processes in the literature for dissolution of the cathode, cathode and anode together, and complete battery prior to the freezing or calcination and grinding thereof, these all lead to dissolving all of the sample components, making multistage separation and purification stages necessary to obtain high purity compounds. Other important issues have been described in a part of the second paragraph in the previous item.

Therefore, at this stage, the inventive step lies in the use of leaching agents "tartaric or acetic acid" not used in any previous works for the dissolution of spent lithium ion batteries cathodes. Obviously, it is clear that the use of acetic acid greatly reduces costs since, as is public knowledge, it is universally available and its commercial price is minimal, besides it being an environmentally friendly and, logically, non-polluting acid. On the other hand, from a purely technical standpoint, as the process starts with of $LiCoO_2$ without impurities, solutions containing only Li and Co and with high performances in the dissolution of said metals are obtained. The solutions may be thus treated directly in order to obtain compounds of these metals with high purity, avoiding several separation stages; or to re-synthesize good quality $LiCoO_2$ without need of purifying the solution and also without the need to add a binder. Thus, the method of the invention has advantages over the prior art, making it a simple procedure, in a limited number of stages, while being environmentally friendly and economically favorable.

Exemplary Embodiments

In the following exemplary embodiments of the method of the invention and in the analysis of the results, a sample of 500 spent lithium ion batteries from cell phones of different brands and models were used. These batteries were discharged and dismantled then selecting the cathodes, from which the $LiCoO_2$ is obtained by dissolving the glue using any of the acids $H_4C_2O_2$, $H_6C_4O_6$, $H_8C_6O_7$, $HNO_3$ or $H_2SO_4$. The $LiCoO_2$ sample was then dried, ground and sieved. The remaining parts of the batteries were stored for future studies.

Materials and Reactants:

The agents used were glacial acetic acid and hydrogen peroxide both of analytical quality, Biopack brand.

Leaching Experiments and Characterization Techniques:

Experiments were conducted in a PVC batch (closed) reactor with a capacity of 500 mL, provided with a heating and agitation system, mounted on a control unit. The characterization of reactants and products was carried out by X-ray diffraction (XRD) on a Rigaku D-Max III C, operated at 35 kV and 30 mA, using $K\alpha$ radiation of Cu and Ni filter and, $\lambda=0.15418$ nm. The morphological analysis of the solids was performed by scanning electron microscopy (SEM) and X-ray detection (EDS) on a LEO 1450VP microscope.

Analysis of Results

Sample Characterization

Figure 1A:
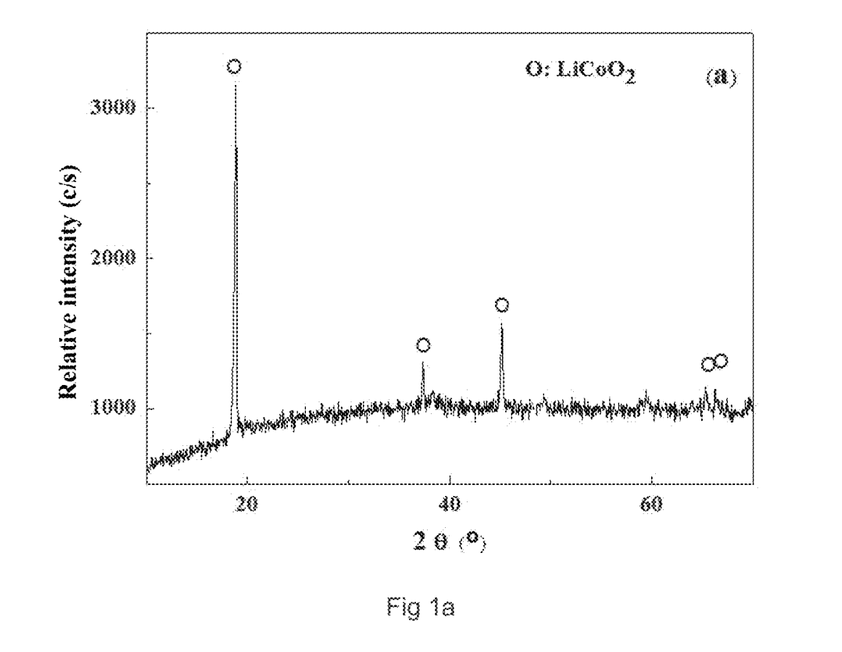
FIGS. 1a and 1b are graphs showing the characterization of $LiCoO_2$ by (a) XRD and (b) SEM.
Figure 1B:
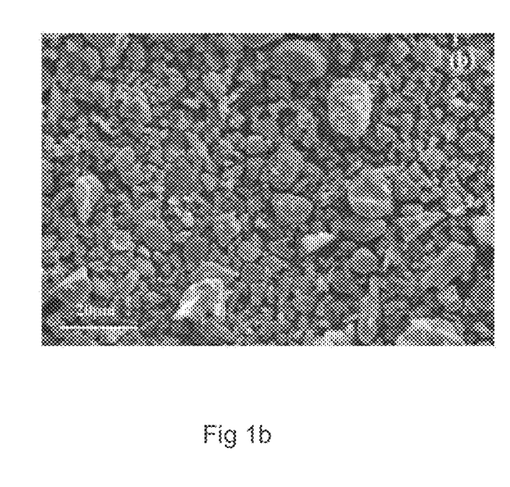

FIG. 1 shows the sample characterization by (a) SEM and (b) XRD. From FIG. 1 (a) it can be seen that the sample is composed of $LiCoO_2$ (ICDD 01-075-0532). The diffractogram in FIG. 1(a) indicates that only one crystal structure exists in the sample, corresponding to $LiCoO_2$ (ICDD 01-075-0532). In FIG. 1(b) it can be seen that $LiCoO_2$ particles have irregular sizes and shapes with rounded edges.

The dissolution efficiency was monitored by the following expression:

$$X\% = [(mi-mf)/mi] \times 100$$

where X %, is the dissolution efficiency percentage, mi, is the initial simple mass and mf, is the final mass of the residue after leaching.

Evaluation of the Operating Parameters.

Effect of $H_2O_2$—$H_4C_2O_2$ Ratio

Figure 2:
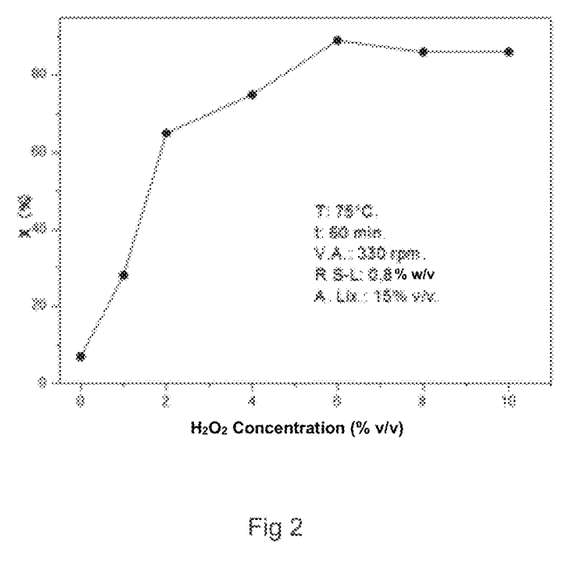
FIG. 2 is a graph showing the effect of the relation $H_2O_2$—$H_4C_2O_2$.

The effect of the $H_2O_2$—$H_4C_2O_2$ ratio was studied by working with $H_2O_2$ in concentrations of 0, 2, 4, 6, 8 and 10% v/v and with $H_4C_2O_2$ in a concentration of 15% v/v. Experiments were performed at 75° C. for 60 min with a agitation speed of 330 rpm and a solid/liquid ratio of 0.8% w/v. The chemical bond between Co and O in $LiCoO_2$ is extremely strong and, therefore, dissolution of $LiCoO_2$ with a weak acid is difficult. When $H_2O_2$ is added to the reaction system, the oxygen resulting from peroxide decomposition reduces Co (III) to Co (II), favoring the dissolution. Since Co and Li are main components of $LiCoO_2$, the dissolution of one promotes dissolution of the other [2]. In FIG. 2 it can be seen that by increasing the concentration of $H_2O_2$, the dissolution rate increases until reaching a concentration of 6% v/v. After such concentration is reached the extraction value remains constant, which may be due to all Co (III) present being reduced. Results showed that the $H_2O_2$—$H_4C_2O_2$ ratio of 6% v/v-15% v/v, respectively, gave the greatest value for $LiCoO_2$ dissolution.

Figure 3:
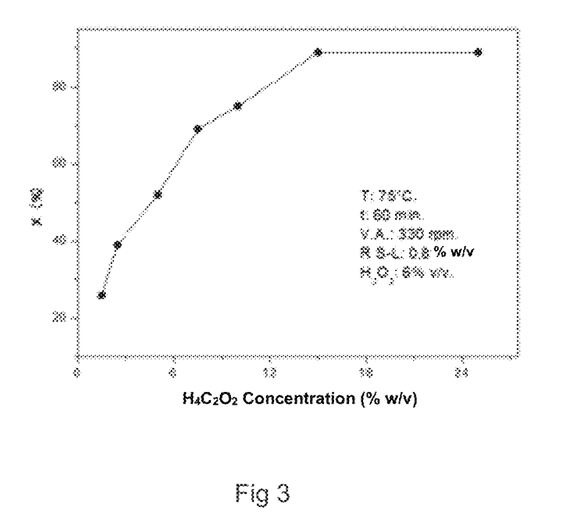
FIG. 3 is a graph showing the effect of the concentration of $H_4C_2O_2$.

Effect of $H_4C_2O_2$ Concentration 0-15 2-15 4-15 6-15 8-15 10-15 0 20 40 60 80 100 X (%) $H_2O_2$/acetic acid ratio (% v/v) 2.5 5.0 7.5 10.0 12.5 15.0 0 20 40 60 80 100 X (%) Concentration of leaching agent (% (v/v)

The study of this variable was performed at 75° C. for 60 minutes, with an agitation speed of 330 rpm, with a $H_2O_2$ concentration of 6% v/v and a solid/liquid ratio of 0.8%. $H_4C_2O_2$ in concentrations of 1.25; 2.5; 5; 7.5; 15 and 25% v/v were used.

From FIG. 3 it can be inferred that the increase in the concentration of $H_4C_2O_2$ has a marked influence on the dissolution. In addition, it is noted that the dissolution percentage decreases after reaching a concentration of 15% v/v, which may be due to that, when reaching this concentration, the system is saturated in protons. The results showed that the best dissolution percentage was obtained by working at a $H_4C_2O_2$ concentration of 15% v/v.

Effect of Reaction Time

Figure 4:
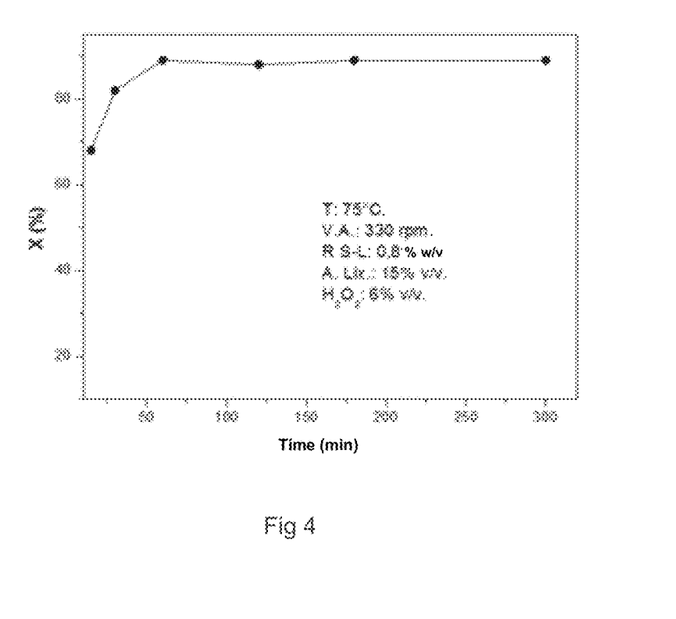
FIG. 4 is a graph showing the effect of reaction time.

The dissolution with $H_4C_2O_2$ may be influenced by reaction time. To study the effect of this variable, experiments were conducted at 75° C., with an agitation speed of 330 rpm, a solid/liquid ratio of 0.8% w/v, and a $H_2O_2$—$H_4C_2O_2$ ratio of 6% v/v-15% v/v. The reaction times studied were 15, 30, 60, 120, 180 and 300 min. In FIG. 4 (a) it can be observed that with increasing reaction time, the percentage of dissolved oxide increases. This behavior may be due to an increased contact time between the leaching agent, the reducing agent and the oxide [7]. Results showed that the optimal reaction time is 300 min.

Effect of Reaction Temperature

Figure 5:
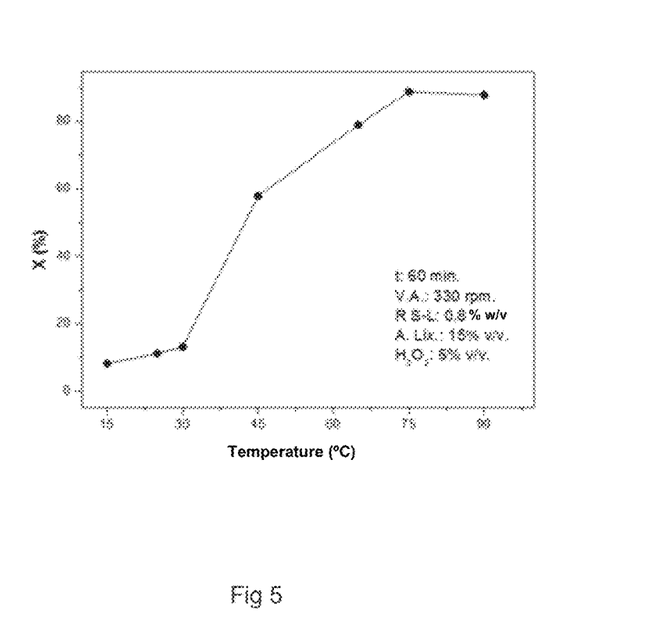
FIG. 5 is a graph showing the effect of temperature.

The influence of temperature on the oxide dissolution was studied by working with a range of temperatures between 15° C. and 90° C., at 15° C. intervals. Experiments were performed for 60 min with an agitation speed of 330 rpm, a solid/liquid ratio of 0.8% w/v and a $H_2O_2$—$H_4C_2O_2$ ratio of 6% v/v-15% v/v. FIG. 5 shows the dependence of the reaction system with temperature, the dissolution percentage increases when increasing this variable. The reaction rate and the ion transfer rate are strongly influenced by the temperature so that, at low temperatures, the dissolution rate is governed by the speed at which the chemical reaction occurs. Increasing the temperature increases the reaction rate and, therefore, the ion transfer rate governs the dissolution rate [7]. 0 30 60 90 120 150 180 210 240 270 300 330 0 20 40 60 80 100 X (%) Time (min.) 0.4 0.8 1.2 1.6 2.0 0 20 40 60 80 100 X (%) solid/liquid ratio (/v) 15 30 45 60 75 90 0 20 40 60 80 100 X (%) Temperature (° C.) 0 100 200 300 400 500 0 20 40 60 80 100 X (%) Agitation speed (rpm)

Effect of Solid/Liquid Ratio

Figure 6:
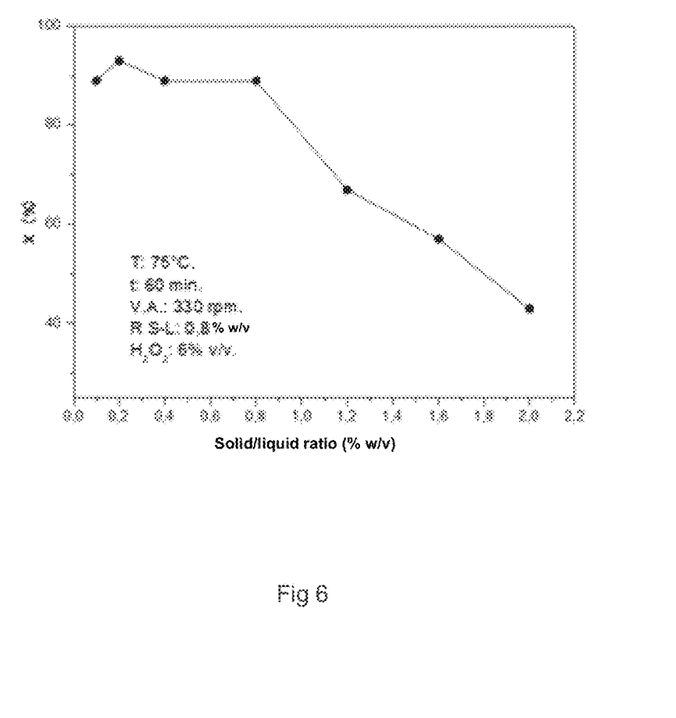
FIG. 6 is a graph showing the effect of the solid/liquid ratio.

The effect of solid/liquid ratio on the dissolving power of the acid system was studied working at 75° C. for 60 min, with an agitation speed of 330 rpm and a $H_2O_2$—$H_4C_2O_2$ ratio of 6-15% v/v, respectively. The values of solid/liquid ratio studied were: 0.4; 0.8; 1.2; 1.6 and 2% w/v. From FIG. 6 it can be inferred that the solid/liquid ratio has a significant influence on the dissolution process. It is observed that by increasing the solid/liquid ratio, the dissolution percentage decreases because there is more oxide in contact with $H_2O_2$—$H_4C_2O_2$. The obtained results showed that, working with a ratio of 0.2% w/v, the best dissolution percentages are obtained.

Effect of Agitation Speed

Figure 7:
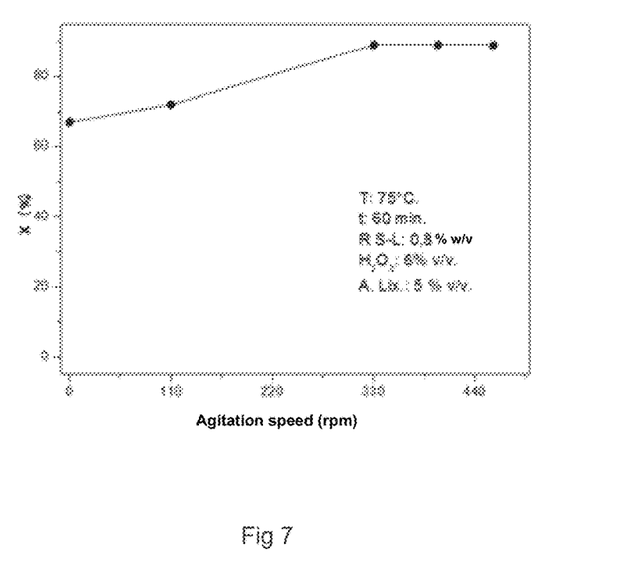
FIG. 7 is a graph showing the effect of agitation speed.

FIG. 7 shows the results of the effect of agitation speed on the dissolution of $LiCoO_2$. Experiments to study this variable were carried out at 0, 110, 330, 400 and 430 rpm, working for 60 min at 75° C., with a solid/liquid ratio of 0.8% w/v and a $H_2O_2$—$H_4C_2O_2$ ratio of 6% v/v-15% v/v, respectively. FIG. 7 shows that the system does not have a strong dependence on the agitation speed, but a noticeable difference in working with and without agitation is observed. Agitation caused a decrease in the boundary layer, increasing the amount of leaching reagent going through said layer, which leads to an increase in dissolution percentage [7]. The results showed that the best leaching percentage was obtained working at 330 rpm.

Characterization of Residues

Figure 8A:
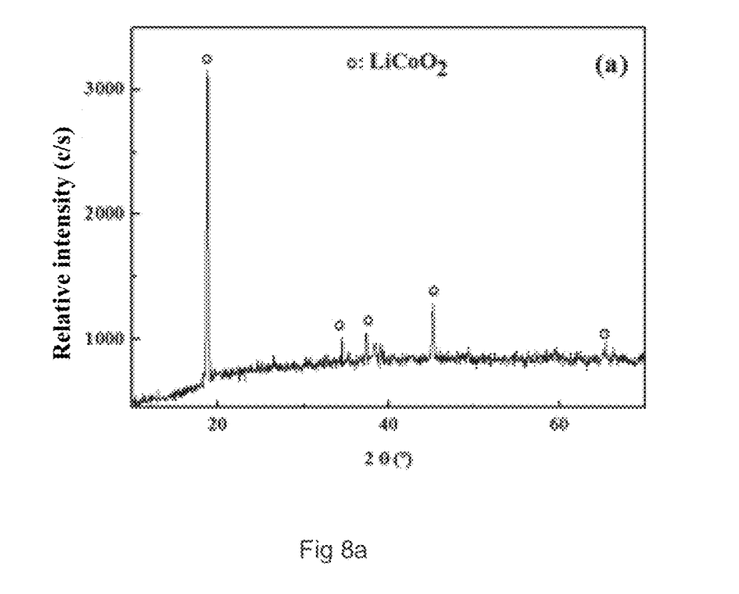
FIGS. 8a and 8b show the characterization of residues by (a) XRD and (b) SEM.
Figure 8B:
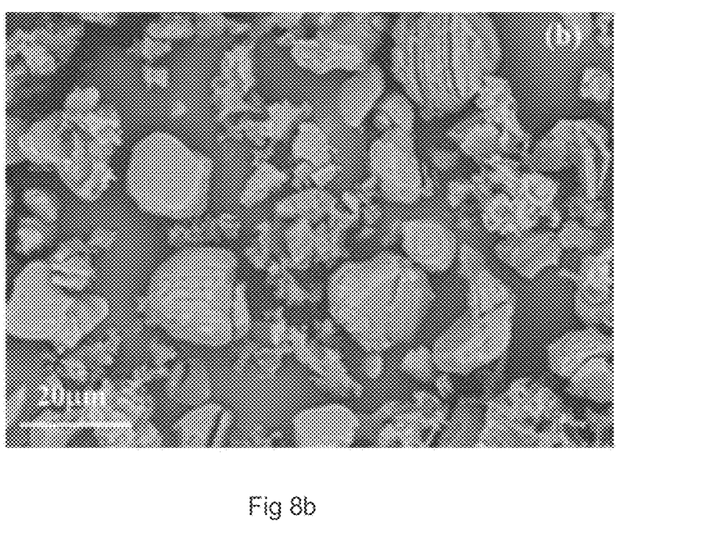

FIG. 8 shows the SEM and XRD of the residues of $LiCoO_2$ dissolution with 10 20 30 40 50 60 70 500 1000 $H_4C_2O_2$.

In FIG. 8(a) diffraction lines corresponding to undissolved $LiCoO_2$ (ICCD 01-075-0532) were identified, the formation of solid products was not detected. In FIG. 8 (b), attacked particles (laminar) and non-attacked particles (rounded) can be observed Therefore, it can be said that spent lithium ion batteries are an alternative source for the recovery of metals, including Li and Co, and their recycling not only brings economic but also environmental benefits. The operating parameters for optimum acid dissolution of $LiCoO_2$ with $H_4C_2O_2$ are: 90° C., a solid/liquid ratio of 0.8% w/v, an agitation speed of 330 rpm and a $H_2O_2$—$H_4C_2O_2$ ratio of 6% v/v-15% v/v, yielding dissolution values close to 90%.

REFERENCES CITED IN THE PRESENT SPECIFICATION

1. L. Li, J. B. Dunn, X. X. Zhang, L. Gaines, R. J. Chen, F. Wu, "Recovery of metals from spent lithium-ion batteries whit organic acids as a leaching reagents and environmental assessment", Journal of Power Sources, 233, 180-189, 2013.
2. L. Li, J. Ge, R. Chen, F. Wu, S. Chen, X. X. Zhang, "Environmental friendly leaching reagent for cobalt and lithium recovery from spent lithium-ion batteries", Waste Management, 30, 2615-2621, 2010.
3. Z. Shu-guang, H. Wem-zhi, L. Guang-ming, Z. Xu, Z. Xiao-jun, H. Ju-wen, "Recovery of Co and Li from spent lithium-ion batteries by combination method of acid leaching and chemical precipitation", Transactions of nonferrous metals society of China, 22, 2274-2281, 2012.

4. L. Li, R. Chen, F. Sun, F. Wu, J. Liu, "Preparation of LiCoO2 film from spent lithium-ion batteries by combined recycling process", Hydrometallurgy, 108, 220-225, 2011.
5. R. Wang, Y. Lin, S. Wu, "A novel recovery process of metal values from the cathode active materials of the lithium-ion secondary batteries", Hydrometallurgy 99, 194-201, 2009.
6. L. Chen, X. Tang, Y. Zhang, L. Li, Z. Zeng, Y. Zhang, "Process for the recovery of cobalt oxalate from spent lithium-ion batteries", Hydrometallurgy 108, 80-86, 2011
7. F. Habashi "Handbook of Extractive Melallurgy", Vol. II y IV, Wiley-VCH, 1997.

The invention claimed is:

1. A method for acid dissolution of $LiCoO_2$ contained in a Li-ion battery cathode, the method comprising a first stage and a second stage, wherein the first stage comprises a step of separating the cathode components by one or more steps of removal of adhesives used to adhere the $LiCoO_2$ to an aluminum foil in the Li-ion battery, wherein such removal of adhesives is effected by means of one diluted acid selected from the group consisting of $H_4C_2O_2$, $H_6C_4O_6$, $H_8C_6O_7$, and $H_2SO_4$, and thus obtaining an aluminum foil as a recycling material, an effluent containing a remainder of the acid used in the first stage, and $LiCoO_2$ without impurities, and wherein the second stage comprises the step of dissolving $LiCoO_2$ from the first stage with acetic acid or tartaric acid as a leaching agent and hydrogen peroxide as a reducing agent.

2. The method according to claim 1, wherein the removal of adhesives by means of one diluted acid comprises several reuse stages of $H_4C_2O_2$, $H_6C_4O_6$, $H_8C_6O_7$, or $H_2SO_4$.

3. The method according to claim 2, wherein after removal of adhesives with $H_2SO_4$, the effluent generated therefrom is dried at low temperature and obtained residues are treated by a waste operator.

4. The method according to claim 1, further comprising a step of recycling the effluent generated after one or more steps of removal of adhesives with one diluted acid selected from $H_4C_2O_2$, $H_6C_4O_6$, or $H_8C_6O_7$ into the second stage, for dissolution of $LiCoO_2$.

5. The method according to claim 1, wherein the second stage starts from a solid without impurities, which is dissolved with acetic or tartaric acids at a concentration lower than 15% v/v or lower than 5% w/v, using a reaction time of less than 60 minutes and a temperature of 75° C., achieving complete dissolution of $LiCoO_2$.

6. The method according to claim 1, further comprising a step of subjecting the $LiCoO_2$ dissolved in the second stage to a sol-gel synthesis method for re-synthesizing $LiCoO_2$.

* * * * *